United States Patent [19]

Appl et al.

[11] 4,336,233

[45] Jun. 22, 1982

[54] REMOVAL OF $CO_2$ AND/OR $H_2S$ AND/OR COS FROM GASES CONTAINING THESE CONSTITUENTS

[75] Inventors: Max Appl, Dannstadt-Schauernheim; Ulrich Wagner, Limburgerhof; Hans J. Henrici, Mannheim; Klaus Kuessner, Heuchelheim; Klaus Volkamer, Frankenthal; Ernst Fuerst, Neustadt, all of Fed. Rep. of Germany

[73] Assignee: BASF Aktiengesellschaft, Fed. Rep. of Germany

[21] Appl. No.: 177,615

[22] Filed: Aug. 13, 1980

Related U.S. Application Data

[63] Continuation of Ser. No. 944,291, Sep. 21, 1978, abandoned, which is a continuation of Ser. No. 736,345, Oct. 28, 1976, abandoned.

[30] Foreign Application Priority Data

Nov. 18, 1975 [DE] Fed. Rep. of Germany ....... 2551717

[51] Int. Cl.$^3$ ............................................ B01D 53/34
[52] U.S. Cl. .................................. 423/228; 423/226; 423/229; 423/234; 423/242; 423/243; 55/68; 55/73
[58] Field of Search ............... 423/226, 234, 228, 242, 423/229, 243; 55/68, 73

[56] References Cited

U.S. PATENT DOCUMENTS

| | | | |
|---|---|---|---|
| 1,783,901 | 12/1930 | Bottoms | 423/229 |
| 1,951,992 | 3/1934 | Perkins | 423/228 |
| 3,071,433 | 1/1963 | Dunn | 423/229 X |
| 3,653,810 | 4/1972 | Bratzler et al. | 423/229 |
| 3,965,244 | 6/1976 | Sykes, Jr. | 423/226 |
| 3,989,811 | 11/1976 | Hill | 423/226 |

Primary Examiner—Earl C. Thomas
Attorney, Agent, or Firm—Keil & Witherspoon

[57] ABSTRACT

An aqueous solution containing from 0.81 to 1.3 moles of piperazine per liter is used as a washing agent for removing impurities such as $H_2S$, $CO_2$ and COS from gases. Piperazine can also be used, in amounts of up to 0.8 mole per liter, together with physical or chemical solvents, to accelerate the absorption of $H_2S$, $CO_2$ and COS. The washing process is used for natural gases, coke-oven gases, gases from the gasification of coal and synthesis gases, of any origin.

9 Claims, 2 Drawing Figures

REMOVAL OF CO₂ AND/OR H₂S AND/OR COS FROM GASES CONTAINING THESE CONSTITUENTS

This is a continuation of application Ser. No. 944,291, filed Sept. 21, 1978 and now abandoned, which is a continuation of application Ser. No. 736,345, filed Oct. 28, 1976 and now abandoned.

The present invention relates to a process for removing $CO_2$ and/or $H_2S$ and/or COS from gases which contain these constituents, particularly as impurities, by washing the gases with absorbents which contain piperazine as an absorption accelerator.

The use of organic solvents or aqueous solutions of organic solvents for removing undesirable acid constituents such as $H_2S$ or $CO_2$ was disclosed long ago. A review by K. Hedden et al in Freiberger Forschungshefte 413 (1967), 6–35, is typical of the comprehensive prior art which discloses removing $CO_2$ and/or $H_2S$ from gases containing these impurities, by washing with a range of physical or chemical solvents or mixtures of both.

Physical solvents for the purposes of the invention are particularly cyclotetramethylenesulfone (Sulfolan ®) and its derivatives, aliphatic acid amides, NMP (N-methylpyrrolidone), N-alkylated pyrrolidones and the corresponding piperidones, methanol and mixtures of dialkyl ethers of polyethylene glycols (Selexol ®).

Amongst the chemical solvents, alkanolamines such as monoethanolamine (MEA), diethanolamine (DEA), triethanolamine (TEA), diisopropylamine (DIPA) and methyldiethanolamine (MDEA) have proved industrially useful.

The primary and secondary alkanolamines are particularly suitable for washing operations where the purified gas must have a very low $CO_2$ content (about 10 ppm of $CO_2$ by volume); however, they suffer from the disadvantage that their regeneration requires a very large amount of steam. The steam consumed for regeneration is very much less in the case of the tertiary alkanolamines, but after having been washed, the gases usually still contain about 100 ppm of $CO_2$ by volume (cf., in particular, German Laid-Open Application DOS No. 1,903,065). However, it has been found that both the physical solvents and the chemical solvents and their mixtures do not give satisfactory results in every case, since each of them suffers from certain disadvantages.

Thus German Laid-Open Application DOS No. 1,542,415 has already proposed increasing the rate of absorption of $CO_2$, $H_2S$ and COS, both by physical solvents and by chemical solvents, by adding monoalkylalkanol/amines or morpholine and its derivatives. The disclosure in German Laid-Open Application DOS No. 1,904,428, that the addition of monomethylethanolamine (MMEA) can be used to accelerate the absorption by a particular tertiary amine, namely MDEA, follows the same general lines.

It is an object of the present invention to provide other, more effective absorption accelerators and to propose suitable processes for their use. It was surprising, and unforeseeable, that, specifically, unsubstituted piperazine would prove more effective than the conventional absorption accelerators without at the same time reducing the absorption capacity of the washing agent, since a publication by Poldermann and Steele (The Oil & Gas Journal, July 30 (1965), page 206) specifically attributes the loss of absorption capacity, for acid gases, of DEA solutions on prolonged use to the formation of N,N'-di-(2-hydroxyethyl)-piperazine. Russian Pat. No. 349,401 discloses an improvement in the regeneration stage of a $CO_2$ washing operation. The washing agent proposed is a mixture of polyethylenepolyamines—not characterized in more detail—containing from 5 to 25 percent by weight of a piperazine derivative, again not specified in more detail. Table 1 of the said Russian patent furthermore shows that the pure polyethylenepolyamine absorbs more $CO_2$ than does the mixture.

The present invention relates to a process for removing $CO_2$ and/or $H_2S$ and additionally in some cases COS from gases which contain these constituents, by washing the gases with absorbents consisting of aqueous solutions which contain at least one component (solvent) which possesses at least one hetero-atom from the group of N, O and S, and subsequently regenerating the solvent, in which process solvents containing piperazine are used.

Gases which can be purified by the process are natural gases, coke-oven gases, gases from the gasification of coal and, preferably, synthesis gases.

COS is partially removed in the process according to the invention. In order to achieve substantial removal of COS, the latter must, before carrying out the process of the invention, be converted in the conventional manner, by hydrogenation, for example in the presence of hydrogen over cobalt-molybdenum-alumina catalysts, or by hydrolysis, or by both measures simultaneously, into readily removable compounds ($CO_2$ and $H_2S$). If catalytic hydrogenation is used, off-gases from Claus plants, containing $H_2S$, COS, $CO_2$ and $SO_2$, can be rendered amenable to the process of the invention.

The following embodiment of the process according to the invention has proved particularly advantageous for synthesis gases, especially for the synthesis gases, containing $H_2S$, $CO_2$ and COS, obtained from the cracking of heavy fuel oil, residual oil or crude oils by partial oxidation:

An auxiliary vessel is fitted in the feed of the stripping column (compare FIG. 2, item 22). The auxiliary vessel is preferably fitted between the preheater (solvent heat exchanger, cf. FIG. 2, item 20) and the top of the stripping column. The temperature in the vessel should be up to 20° C. below the temperature range at the bottom of the stripping column. Thus, at the bottom temperature of 110°–120° C. which applies to the tertiary alkanolamines used preferentially, the temperature range of the auxiliary vessel is 90°–100° C. Surprisingly, the fitting of the auxiliary vessel also has the effect that the COS content in the $CO_2$ off-gas of the stripping column is lowered to about 1/6. This was as surprising to those skilled in the art as the fact that in order to achieve a maximum content of 1 ppm of COS by volume in the purified gas, the energy consumption for regeneration is the same as if there was no COS in the gas to be washed, if the maximum content of $CO_2$ in the gas to be purified has to meet the same requirements.

Piperazine has a melting point of 107° C. and may be obtained by, for example, reacting monoethanolamine with ammonia, or reacting ethylene oxide and $NH_3$ and cyclizing the ethanolamines thereby obtained.

The process according to the invention employs aqueous solutions of a bottom product obtained as a by-product from the synthesis of ethylenediamine from monoethanolamine and ammonia; this material also contains 0.3 percent by weight, based on piperazine, of the following by-products: $NH_3$, ethylenediamine, MEA and further nitrogen-containing products which have not been investigated in more detail; these constituents do not interfere with the process according to the invention.

According to the invention, an aqueous solution which contains only piperazine, in amounts of from 0.81 to 1.3 mole/l, can be used as the absorbent. However, the use of piperazine alone as the washing agent is of limited applicability, since at concentrations of less than 0.81 mole/l the $CO_2$ and $H_2S$ absorption capacity is no longer adequate, whilst larger amounts than 1.3 mole/l cannot be used because in the presence of $CO_2$, especially at high $CO_2$ partial pressures, the carbamate of piperazine precipitates, and in any case the solubility of piperazine at 20° C. is only 1.5 mole/l.

In combination with physical and/or chemical solvents, or mixtures of both groups, piperazine can be used in amounts of up to 0.8 mole/l. Amounts of up to 0.5 mole/l in mixtures have proved adequate. It is particularly preferred to add from 0.05 to 0.4 mole/l of piperazine, especially from 0.2 to 0.4 mole/l.

Accordingly, the use of piperazine in catalytic amounts, as an absorption accelerator in aqueous solution, together with conventional physical or chemical solvents or their mixtures, is particularly preferred.

We have found that amongst the industrially used physical solvents, eg. methanol, mixtures of cyclotetramethylenesulfone, DIPA and water (Sulfinol ®), NMP and dimethyl ethers of polyethylene glycols (Selexol ®), only very dilute aqueous solutions can be used together with piperazine, because of the formation of piperazine carbamate. At least 60 percent by weight of water must be added to NMP and piperazine mixtures to prevent the precipitation of the carbamate at high $CO_2$ partial pressures. As far as the other solvents mentioned are concerned, broadly the same applies. Mixtures of physical and chemical solvents have been investigated, in respect of the addition of piperazine, in the case of the system NMP/methyldiisopropanolamine/$H_2O$, and satisfactory results were obtained.

The preferentially used chemical solvents are employed in amounts of from 1.5 to 4.5 moles/l. It is not essential to observe these limits when carrying out the process according to the invention, since when using amounts of less than 1.5 mole/l the process merely becomes less economical because the amount circulating is large due to the relatively low loading capacity of the solution. Concentrations above 4.5 mole/l as a rule give excessively viscous solutions, and furthermore these contain a very high concentration of acid components, eg. $CO_2$, resulting in increased corrosion hazards in the hot parts of the plant. If physical solvents or mixtures of physical and chemical solvents are used together with piperazine the most advantageous ratio of physical to chemical solvent must in each case be determined by a few experiments, always bearing in mind economic considerations.

Chemical solvents for the purposes of the invention are, for example, aminocarboxylic acids, potassium hydroxide and alkanolamines, particularly their dialkyl and monoalkyl derivatives.

The use of piperazine in aqueous solution together with other chemical solvents, eg. salts of aminocarboxylic acids, potassium hydroxide or chemical solvents containing at least one OH group and at the same time at least one nitrogen atom, eg. alkanolamines, has proved particularly suitable. Amongst the alkanolamines, alkylalkanolamines containing secondary and tertiary nitrogen atoms, and their dialkyl and monoalkyl derivatives, should be mentioned particularly. The following may be mentioned specifically: amongst secondary alkanolamines, DEA, DIPA and MMEA, and amongst tertiary alkanolamines—which are used very preferentially—TEA and MDEA. The other tertiary alkanolamines such as dimethylethanolamine (DMEA), diethylethanolamine (DAEA) and methyldiisopropanolamine are more volatile than TEA and MDEA. Hence, if these alkylalkanolamines are used, a water wash must be provided both for the absorption of column and for the main flash column.

It will be obvious to those skilled in the art that tertiary alkanolamines not expressly named here can also be used provided they conform to the conventional conditions such as solubility in water and absorption capacity for acid constituents (loading capacity), and provided the viscosity of the solution lies within the conventional range. It merely requires a few exploratory experiments to establish the usability of such other compounds.

The process of the invention can be carried out at atmospheric of superatmospheric pressure, advantageously at total pressures of from 20 to 100 bars, especially at $CO_2$ partial pressures of up to 20 bars, by one-step or two-step washing. The choice of the washing method as a rule depends on the required final purity and on the admissible additional heat consumption.

The process can be carried out either with packed columns or with columns fitted with bubble plates. The temperature of the solvent should not exceed 100° C., since at higher temperatures the amount loaded is less and, quite generally, high temperatures cause undesirable corrosion. The absorption is as a rule carried out at a column top temperature of from 60° to 80° C'', though the temperature may rise by up to 15° C. to 95° C. The absorption can also be carried out at lower temperatures, eg. from 40° C. upward; however, such low temperatures result in an increased consumption of energy (steam), particularly if stripping is to be carried out. The bottom of the absorption column should be at not more than 100° C.

The laden solvent can be flashed in one or more stages, for example using an expansion turbine, before being substantially regenerated in a desorption column, which is packed or fitted with trays, and which can be heated indirectly or directly.

If, after flashing, stripping is carried out in a column, the pressure in the main flashing stage is advantageously from 1.01 to 1.3 bars.

The solvent which runs to the desorption column can be heated, in a countercurrent heat exchanger, by means of the discharged solvent. The solvent is fed to the top of the absorber, by means of a pump, via a cooler in which the material can be brought to the desired top temperature of the absorber.

If the washing is carried out in two stages, only a part of the solvent coming from the desorption column is fed to the top of the absorber, and this solvent is relatively at a lower temperature than in the case of single-stage washing. The remainder is fed, from the main flashing stage, to another point of the absorber, at a higher temperature. In this case, the exchange surface area required is greater but the impurities are removed completely.

Figure 1:
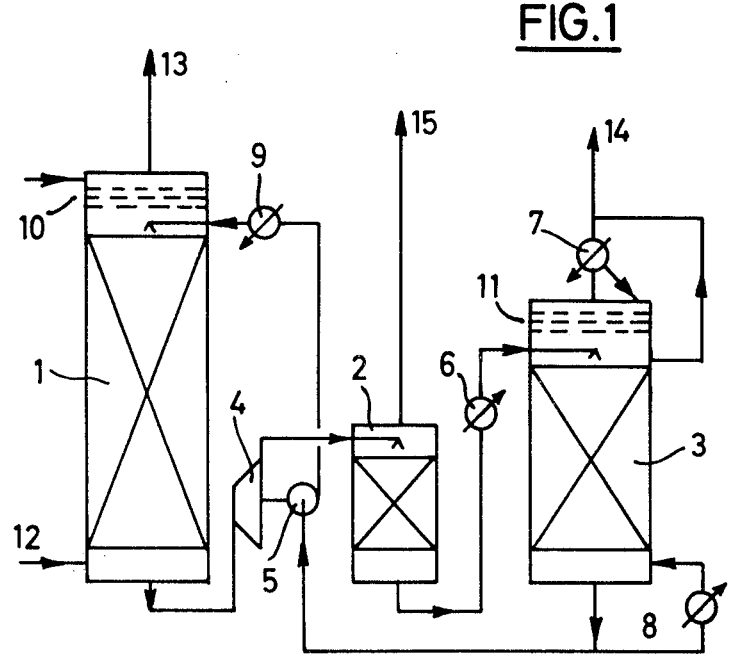
FIG. 1 shows each show a flow diagram for carrying out a rough washing.

FIG. 1 shows a rough wash with a flashing circuit. This method is particularly suitable for gases in which the partial pressures of the components to be removed are high, whilst the standards of purity demanded of the washed gases are low. The water balance of the system is regulated by means of the water wash arrangements at the top of the absorption column and of the main flash column. At the same time, the solvent losses can in this way be kept low. For this reason, the heat exchange to compensate for the loss of energy by entrained steam, should preferably be effected indirectly.

A rough wash using a flashing circuit may be carried out as follows:

The gas to be washed is supplied through line 12 to the absorption column 1 through which it flows from bottom to top countercurrent to the solvent which is charged at the top of the column below water trays 10. The washed (treated) gas leaves the absorption column 1 at the top of via line 13. The solvent loaded with sour gas leaves column 1 at the bottom and is flashed through a flash turbine 4 into the preliminary flash column 2. It is then supplied via heat exchanger 6 to the main flash column 3 and flashed to substantially atmospheric pressure. The degassed solvent leaves the main flash column at the bottom and is forced by pump 5 via cooler 9 into the top of the absorption column. The flash gas from the intermediate flash stage leaves column 2 at the top through line 15. The flash gas from main flash column 3 leaves at the top through line 14 after passing through water wash 11 where amine entrained according to partial pressure is washed back into the column by means of condensate from cooler 7, and is then cooled in cooler 7. The heat balance of the wash is maintained by heat exchanger 8 at the bottom of column 3, while the water balance is regulated by the amount of condensate supplied to water wash 10 at the top of column 1.

Figure 2:
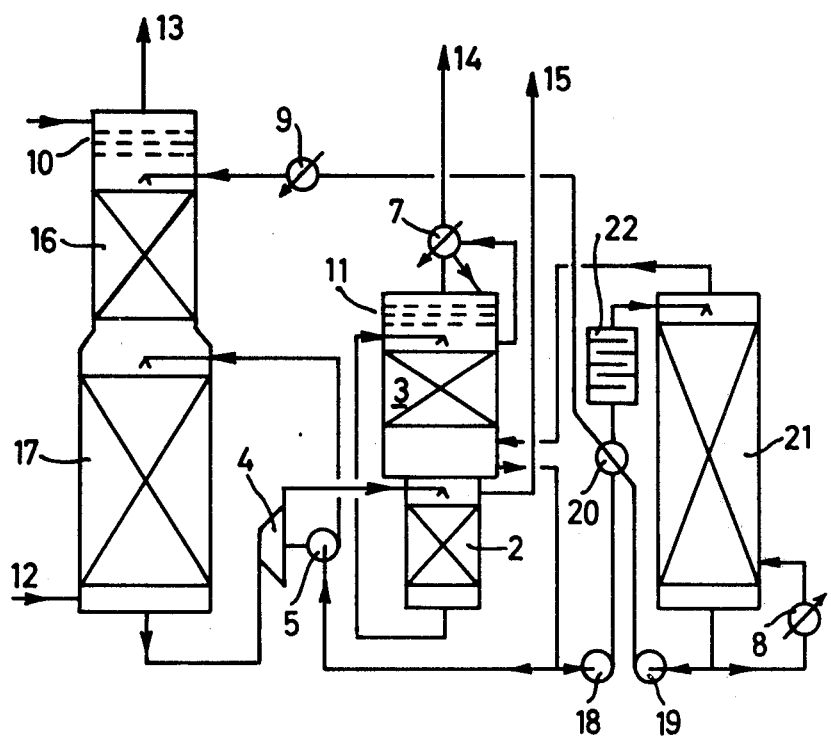
FIG. 2 shows a flow diagram for carrying out a two-stage washing employing a rough and fine washing. Such arrangements are preferred for carrying out the process of the invention.

In the flow diagram, the reference numerals having the following meanings:
1 absorption column
2 preliminary flash column
3 main flash column
4 flash turbine
5 pump
6 heat exchanger 1
7 heat exchanger 2
8 heat exchanger, indirectly heated reboiler
9 solvent cooler
10 condensate water feed with water wash, treated gas
11 water wash, sour gas
12 feed gas
13 treated gas
14 sour gas
15 inert material FIG. 2 shows a preferred flow diagram for two-stage washing (rough and fine washing) with 2 flashing stages and one desorption stage (stripper). The absorption column 1 comprises two sections 17 (rough wash) and 16 (fine wash). The solvent loaded with sour gas is flashed, in turbine 4 and flash columns 2 and 3. The solvent leaving main flash column 3 at the bottom is divided into two streams. The main stream goes to rough wash 17 after passing through pump 5, while the smaller portion of the flashed solvent is pumped by pump 18 through heat exchanger 20 and auxiliary vessel 22 (containing the COS hydrolysis) to the top of column 21. Reboiler 8 converts some of the solvent into vapor with which the solvent in column 21 is stripped from sour gas. The solvent stream thus regenerated is pumped by pump 19 through heat exchangers 20 and 9 for cooling, and then fed to fine wash 16. The vapor leaving at the top of desorption column 21 is supplied to the bottom of the main flash column 3 in order to maintain the heat balance in the flash cycle. The fine wash absorption column 16 and the main flash column 3 are each equipped with a water wash (10 and 11).

In FIG. 2, the numerals denote the following:
2 preliminary flash column
3 main flash column
4 flash turbine
5 pump
7 heat exchanger 2
8 heat exchanger, indirectly heated reboiler
9 solvent cooler
10 condensate water feed with water wash, treated gas
11 water wash, sour gas
12 feed gas
13 treated gas
14 sour gas
15 inert material
16 fine wash column
17 rough wash column
18 pump
19 pump
20 heat exchanger
21 desorption column
22 auxiliary vessel To demonstrate the superiority of piperazine as an absorption accelerator compared to the accelerator MMEA of the prior art (German Laid-Open Applications Nos. 1,542,415 and 1,904,428) the absorption rates of $CO_2$ and $H_2S$ in the jet stream chamber were compared under standard conditions. Table 1 shows the relative increase in the absorption rates of $CO_2$ and $H_2S$, based on the pure aqueous washing agents MDEA=1 and TEA=1. These were determined from the mass transfer coefficients $K_G$, obtainable from jet stream chamber measurements, by calculating the relative value. The amounts of absorption accelerator added were in each case 5 mole percent or 10 mole percent, based on total mixture. In the case of MDEA, 3.5 molar aqueous solutions, or complete mixtures in which the molarity was 3.5, were used. The same remarks apply to DEA. For TEA and its mixtures 2.5 molar solutions were used.

The results show (compare Table 1) that the absorption rate of the chemical solvents, especially the absorption rate of $CO_2$, can be increased substantially by adding piperazine, especially in the case of the tertiary amines. Even in the case of DEA a noticeable effect can be demonstrated; the same is true of very dilute aqueous mixtures of piperazine with a physical solvent (compare Experiment 7).

The addition of monosubstituted piperazine derivatives, such as hydroxyethyl piperazine or hydroxyisopropyl piperazine, also produces an increase in the rate of absorption of $CO_2$; however, the relative values are lower than in the case of the absorption accelerator MMEA, for comparable molar amounts added.

The relative rates of absorption of $H_2S$ are not increased to the same extent as the rates of absorption of $CO_2$ when adding absorption accelerators to the predominantly present washing agents. This is understandable, since the $K_G$ values for $H_2S$ are already one or two powers of ten higher than the corresponding values for the $CO_2$ absorption.

When adding piperazine, the absorption accelerator essential to the invention, to other washing agents, it is not only the rate of absorption but also the loading capacity of the mixture for $H_2S$ and $CO_2$ which is increased, sometimes substantially. This may be seen from Table 2, which shows some loading capacities in cubic meters (S.T.P.)/cubic meter of washing agent at 0.66 bar and 75° C. for a number of washing agents before and after addition of piperazine. The concentration was the same when using the absorption accelerators as without these (2.5 molar in the case of TEA and 3.5 molar in the case of MDEA as washing agent).

It follows from the above that the loading differences $\Delta x$ are also increased on adding piperazine to the washing agents of the prior art. This can be seen from Table 3 below, in which MDEA is the washing agent and various amounts of absorption accelerators are employed. The loading differences $\Delta x$ for $CO_2$ are shown in Table 3 for flashing from $pCO_2=5$ bars to $pCO_2=0.01$ bar at 20° C. It can be calculated from these loading differences (compare column 3 of Table 3) that the amounts of solvent which circulate can be reduced if absorption accelerators are employed; this means a saving in operating materials. It is also possible to reduce the height of the absorption towers; this means a saving in investment required. In the case of existing installations, it is possible to increase the throughput if the remaining parts of the installation, such as pumps and the like, are of appropriate size.

TABLE 1

| Washing agent | Additive | Amount of additive 5 mole % | Amount of additive 10 mole % | Relative rate of absorption of $CO_2$ | Relative rate of absorption of $H_2S$ |
|---|---|---|---|---|---|
| MDEA | — | — | — | 1.0 | 1.0 |
| 1 | MMEA | x | — | 5.1 | — |
| 2 | MMEA | — | x | 8.4 | 1.21 |
| 3 | Piperazine | x | — | 8.1 | 1.32 |
| 4 | Piperazine | — | x | 13.4 | — |
| TEA | — | — | — | 1.0 | 1.0 |
| 5 | Piperazine | x | — | 4.3 | 2.12 |
| DEA | — | — | — | 1.0 | — |
| 6 | Piperzine | x | — | 2.0 | — |
| NMP+ | — | — | — | 1.0 | — |
| 7 | Piperazine | (+) | — | 2.1 | — |

+pure anhydrous NMP
(+)mixture of 20 percent by weight of NMP, 5 percent by weight of piperazine and 75 percent by weight of water.

TABLE 2

| Washing agent | Additive 5% | Additive 10% | Loading values for $H_2S$ | Loading values for $CO_2$ |
|---|---|---|---|---|
| TEA | — | — | 11.5 | 6.4 |
| (1) Piperazine | x | — | 29.0 | 18.8 |
| MDEA | — | — | 29.0 | 18.8 |
| (2) MMEA | — | x | 32.9 | 21.5 |
| (3) Piperazine | x | — | 33.2 | 21.5 |

TABLE 3

| | $\Delta x$ | Amount circulating based on MDEA = 1 |
|---|---|---|
| MDEA+ | 37.8 | 1.0 |
| plus | | |
| (1) 10% of MMEA | 40.0 | 0.95 |
| (2) 5% of piperazine | 40.6 | 0.93 |
| (3) 10% of piperazine | 42.0 | 0.90 |

+3.5 molar aqueous solution; the amounts added are in mole percent, based on the total mixture.

The process of the invention is explained in more detail by Examples 1 to 4 which follow. All the experiments described in the Examples were carried out on a pilot-scale installation, the absorption column of which had an internal diameter of 300 mm and was packed with metal Pall rings.

In Example 1, a converted synthesis gas originating from a steam reforming installation, and containing only $CO_2$ as an acid impurity, was washed according to the invention. In Example 2, the superior effect of the process according to the invention is illustrated for the case of a gas of the same origin. Examples 3 and 4 demonstrate that synthesis gases of other origin, for example those formed by the autothermal cracking of heavy sulfur-rich oils, can also be purified by the process according to the invention.

EXAMPLE 1

Per hour, 260 cubic meters (S.T.P.) of a converted synthesis gas containing 29 percent by volume of $CO_2$ (=75.4 cubic meters (S.T.P.)/hr of $CO_2$) were washed, in an absorption column, in countercurrent with 2.4 cubic meters/hr of an aqueous 3.5 molar amine solution which contained 3.325 mole/l of MDEA and 0.175 mole/l of piperazine. The $CO_2$ content in the washed gas was 200 ppm by volume. The absorption column contained 35 mm Pall rings as a bed 9 m high.

The laden solvent was then regenerated as shown in FIG. 2. The stripped solvent was fed to the top of the absorption column at 70° C. The solvent laden with $CO_2$ left the column bottom at a temperature of 93° C.

EXAMPLE 2

About 240 cubic meters (S.T.P.)/hr of a synthesis gas converted as described in Example 1 were washed in an absorption column, packed to a total height of 3.30 m with 35 mm Pall rings, in countercurrent with 2.4 cubic meters/hr of various aqueous amine solutions. The composition of the amine solutions, the type of additive, feed loading, the $CO_2$ content in percent by volume (feed gas and treated gas), the depletion factor which is the quotient of the $CO_2$ concentration of the starting gas and the $CO_2$ concentration of the treated gas and the specific steam consumption are shown in Table 4. The laden solution was regenerated, as shown in FIG. 2, by twice flashing, to 3 bars and 1.02 bars respectively, and then stripping. In all the experiments, the stripped amine solution was fed at 75° C. to the top of the absorption column, which was operated under a pressure of 16 bars.

TABLE 4

| Amine solution | Feed loading (cubic meters (S.T.P.)/ cubic meter) | CO$_2$ content (% by volume) | | Depletion factor | Specific steam consumption [kJ/cubic meter] |
| --- | --- | --- | --- | --- | --- |
| | | Feed gas | Treated gas | | |
| 3.5 moles/l of MDEA | 0.1 | 29.8 | 11.7 | 2.5 | 146,000 |
| 3.325 moles/l of MDE + 0.175 mole/l of MMEA | 0.3 | 31.3 | 1.95 | 16 | 150,000 |
| 3.325 moles/l of MDEA + 0.175 mole/l of piperazine | 0.33 | 27.0 | 0.1 | 270 | 150,000 |
| 3.15 moles/l of MDEA + 0.35 mole/l of piperazine | 0.45 | 27.1 | 0.013 | 2080 | 165,000 |
| 2.375 moles/l of TEA + 0.125 mole/l of piperazine | 0.34 | 26.9 | 8.0 | 3.4 | 132,000 |

It can be seen from the table that for the same specific steam consumption the depletion factor is greater by a factor of from 15 to about 125 when carrying out the process according to the invention.

EXAMPLE 3

268 cubic meters (S.T.P.)/hr of a synthesis gas containing 7.8% by volume of CO$_2$ and 0.8% by volume of H$_2$S were washed in an absorption column packed to a height of 5 m with Pall rings of 25 mm diameter, under a pressure of 18 bars, in countercurrent with 2.3 cubic meters/hr of an aqueous solution which contained 3.315 moles/l of MDEA and 0.175 mole/l of piperazine. The laden solvent was regenerated as described in Example 1 and was then charged at 60° C. to the top of the absorption column. The washed gas contained 200 ppm by volume of CO$_2$ and 3 ppm by volume of H$_2$S. The depletion factor feed gas/treated gas was 390:1 for CO$_2$ and 2,666:1 for H$_2$S.

(The synthesis gas was prepared from a synthesis gas containing CO$_2$, by admixture of 0.8% by volume of H$_2$S.)

EXAMPLE 4

(a) 170 cubic meters/hr of a synthesis gas were washed in an absorption column, which was packed to a height of 10 m with Pall rings of 25 mm diameter, in countercurrent with 2 cubic meters/hr of an aqueous absorption solution, at an operating pressure of 12 bars. The synthesis gas originated from the autothermal cracking of hydrocarbons and contained 22.5% by volume of CO$_2$, 0.9% by volume of H$_2$S and 600 ppm by volume of COS. The absorption solution was 3.5 molar and contained 0.2 mole/l of piperazine and 3.3 moles/l of MDEA. The laden solution was regenerated by flashing and stripping.

The regenerated solution was charged to the absorption column at 65° C. The stripping column had the same dimensions as the absorption column and was packed to a height of 6.90 m with metal Pall rings of 35 mm diameter. This column was operated at 1.7 bars and 120° C. bottom temperature. The treated gas obtained under these operating conditions still contained 10 ppm by volume of CO$_2$, 2 ppm by volume of H$_2$S and 1 ppm by volume of COS; the CO$_2$ off-gas contained 4 ppm by volume of H$_2$S and 300 ppm by volume of COS.

(b) After carrying out this experiment, the experimental apparatus was modified by fitting an auxiliary vessel in the feed to the stripping column (compare FIG. 2, item 22). The flashed solution, after solvent/solvent cooling, was fed into an auxiliary vessel of 300 l capacity, which was fitted with 5 baffles. Under these experimental conditions, the energy used to regenerate the solvent was 208.50 Joule/cubic meter of solution. The same specification of treated gas as described under (a) was obtained, while the CO$_2$ off-gas only contained 50 ppm by volume of COS. However, the energy supplied for regenerating the solution in case (a) was 251.8 Joule/cubic meter of solution; this means that in the particularly preferred embodiment of the process according to the invention, an energy saving (of up to 30%) in the regenerating part of the apparatus is achievable in the case of gases containing COS.

We claim:

1. In a process for removing CO$_2$, H$_2$S or both as constituents from gases by washing the gases with an aqueous solution of a scrubbing liquid and subsequently regenerating the scrubbing liquid, the improvement which comprises: using a scrubbing liquid which contains (a) from about 0.05 to 0.8 mole/l of piperazine as an absorption accelerator and (b) from about 1.5 to 4.5 moles/l of methyldiethanolamine, and carrying out the washing of the gases with the scrubbing liquid at temperatures of from about 40° C. upward.

2. A process as set forth in claim 1 wherein the scrubbing liquid contains tertiary alkylalkanolamines.

3. A process as set forth in claim 1, wherein gases additionally containing COS are washed.

4. A process as set forth in claim 1, wherein synthesis gases obtained by partial oxidation and additionally containing COS as impurity are washed by fitting an auxiliary vessel between the preheater and the top of the stripping column, the temperature in the vessel being up to 20° C. below the temperature at the bottom of said stripping column.

5. A process as set forth in claim 1, wherein the washing of the gases with the scrubbing liquid is carried out at temperatures of from about 40° to 120° C.

6. A process as set forth in claim 1, wherein scrubbing liquid contains from 0.05 to 0.4 mole/l of piperazine.

7. In a process for removing CO$_2$, H$_2$S or both as constituents from gases (a) by washing the gases with an aqueous solution of methyldiethanolamine as scrubbing liquid, (b) subsequently regenerating the scrubbing liquid and (c) recirculating the scrubbing liquid to the washing step (a), the improvement which comprises: using a scrubbing liquid which contains (d) from about 1.5 to 4.5 moles/l of methyldiethanolamine to which (e) from about 0.05 to 0.8 mole/l of piperazine is added, and (f) washing the gases with the scrubbing liquid at a temperature of from about 40° C. upward.

8. A process as set forth in claim 7, wherein the washing of the gases with the scrubbing liquid takes place at a temperature of from about 40° C. to 120° C.

9. A process as set forth in claim 7, wherein the scrubbing liquid contains from 0.05 to 0.4 mole/l of piperazine.

* * * * *